Oct. 18, 1932.   E. H. J. C. GILLETT   1,882,806
FRICTION CLUTCH FOR THE TRANSMISSION OF POWER
Filed Nov. 1, 1929    4 Sheets-Sheet 4

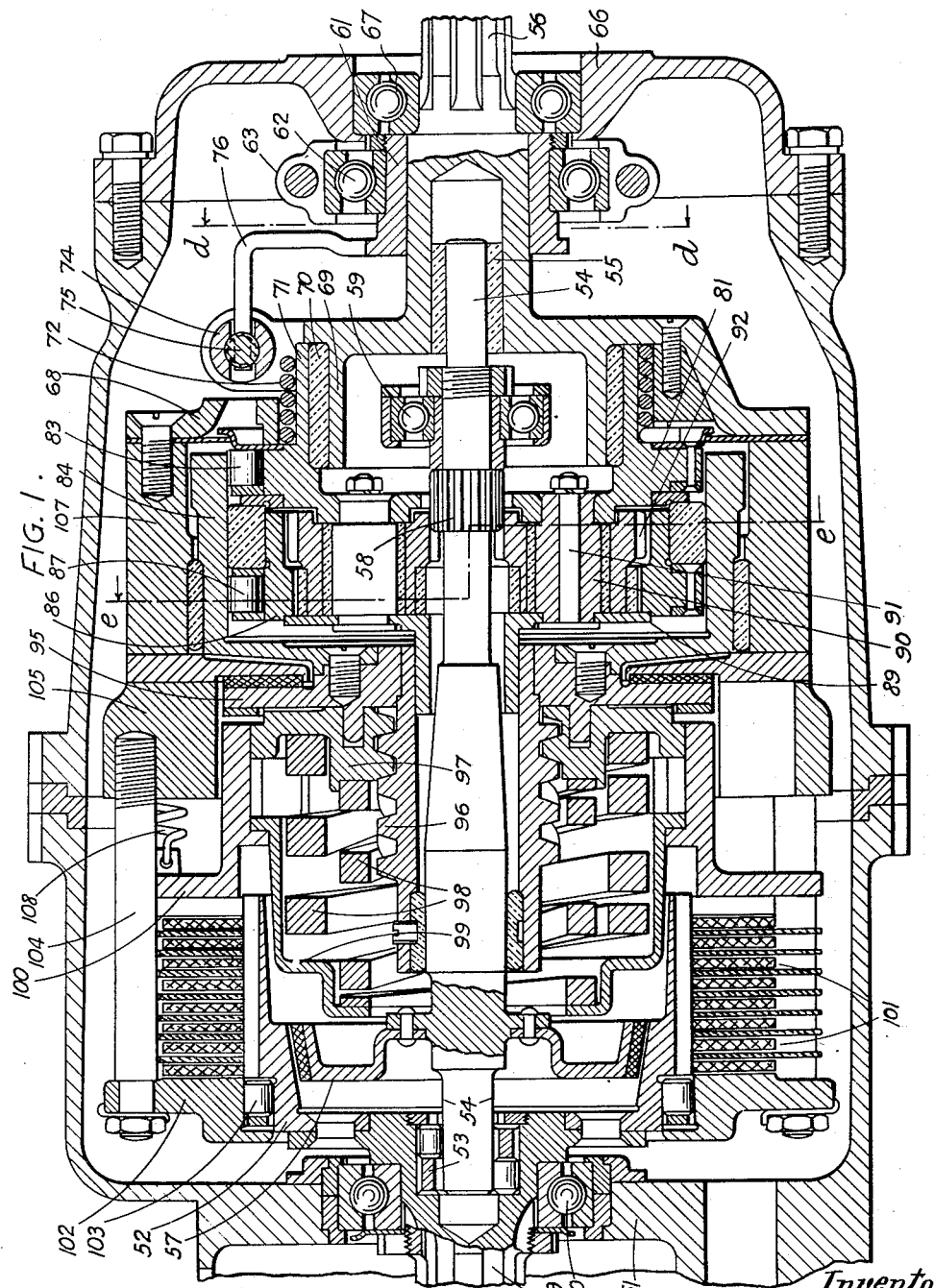

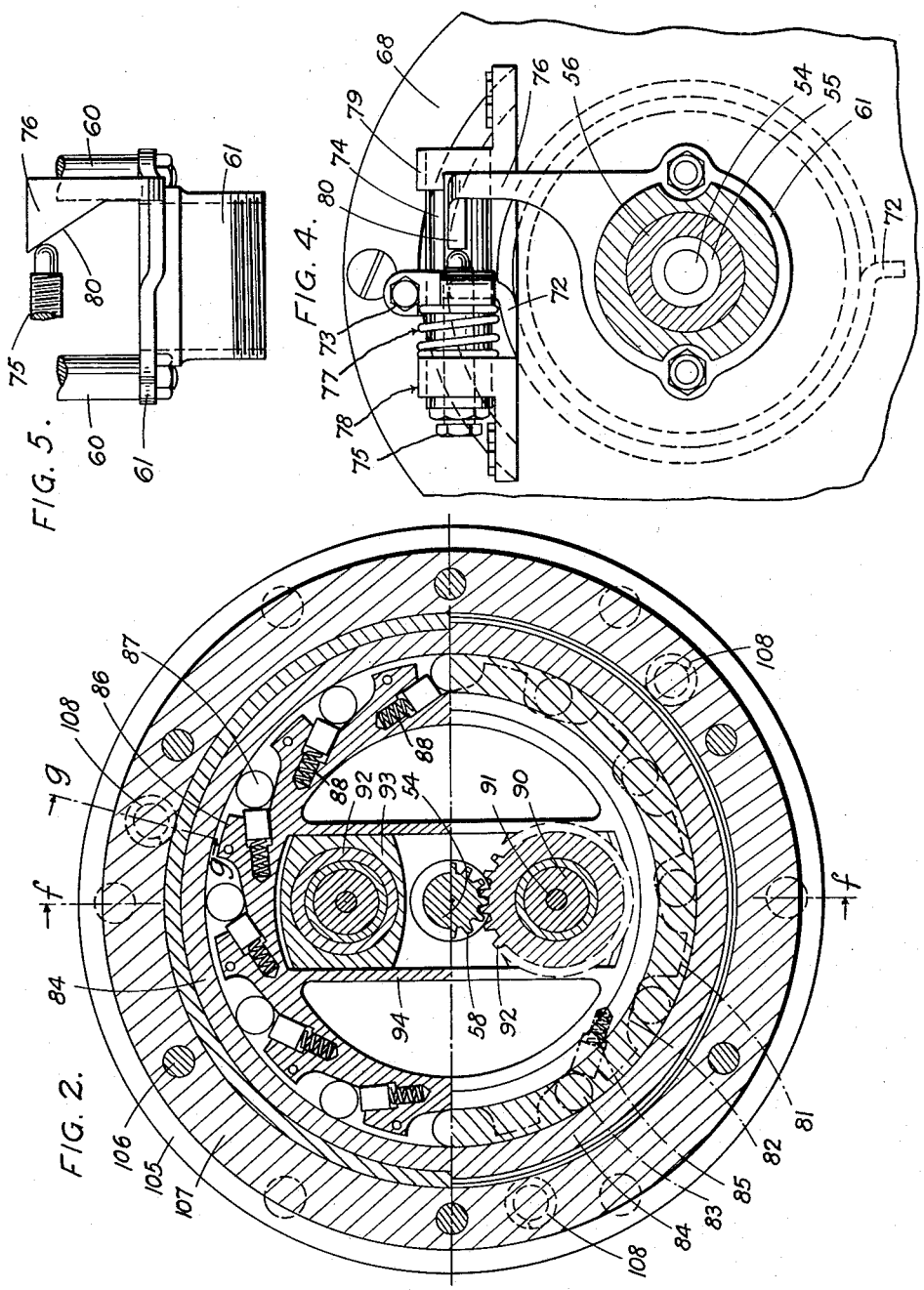

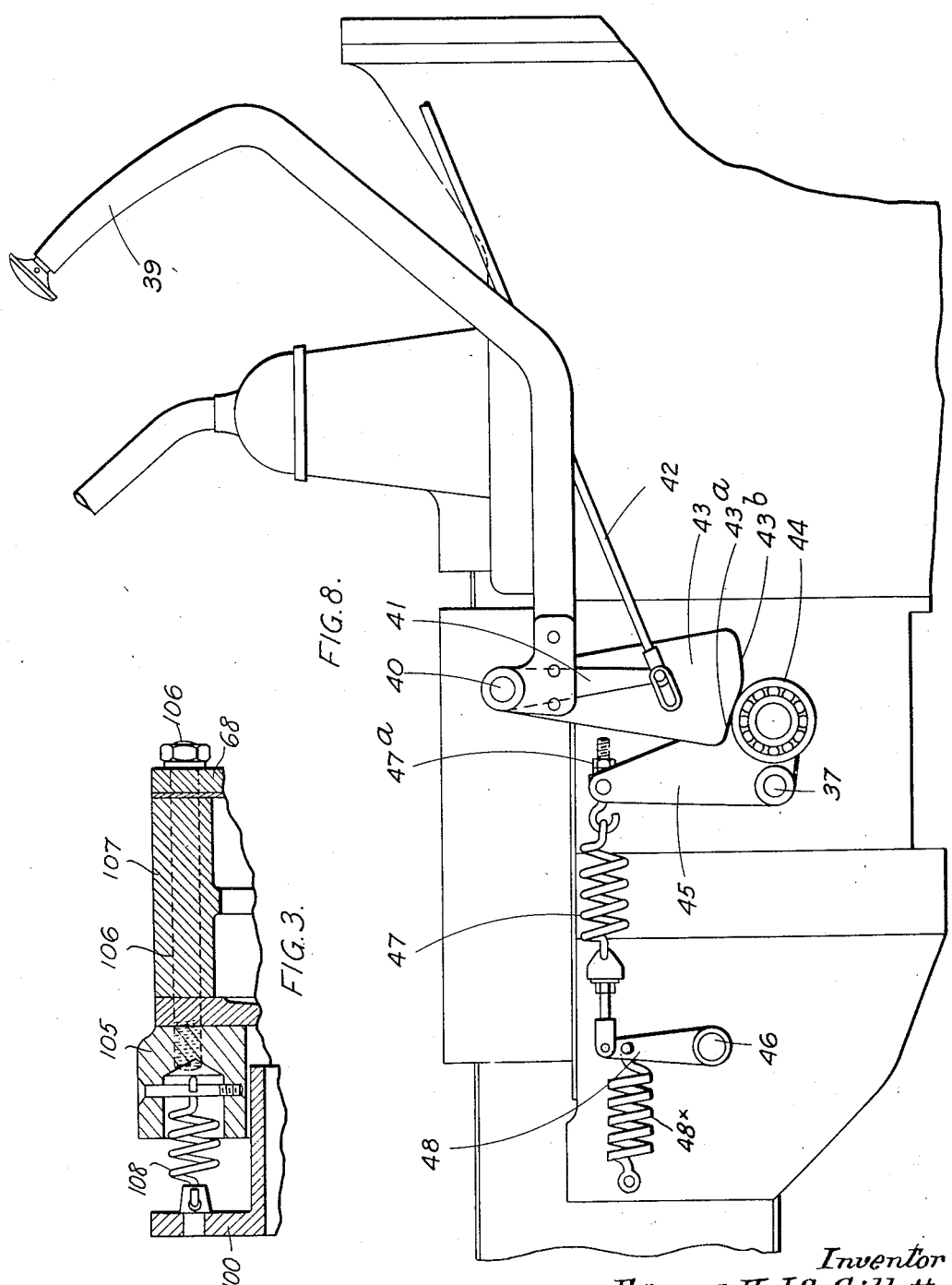

Inventor
Edward H.J.C.Gillett
by Wilkinson & Hiusta
Attorneys.

Patented Oct. 18, 1932

1,882,806

UNITED STATES PATENT OFFICE

EDWARD HENRY JAMES CECIL GILLETT, OF WEST HAMPSTEAD, LONDON, ENGLAND

FRICTION CLUTCH FOR THE TRANSMISSION OF POWER

Application filed November 1, 1929, Serial No. 404,126, and in Great Britain November 6, 1928.

This invention relates to friction clutches for automobiles and has for its primary object the provision of means for dispensing with the usual independent clutch pedal by carrying out the control of the clutch by means of the accelerator of the motor in such a way that when the accelerator is released the clutch is automatically disengaged, while on accelerating the motor the clutch is engaged and takes up the drive.

By this means a free-wheel is virtually obtained, but in order to render possible the use of the motor as a brake and to allow of the complete control of the motor output with the clutch in engagement, the arrangement is preferably such that the clutch is engaged by the first part of the movement of the accelerator, further movement serving only to influence the motor output and if desired the clutch operating range of the accelerator may be made to have no effect on the motor, the output being kept at a minimum till the clutch is engaged.

This arrangement would of itself be likely to lead to stalling the motor and a further object of the invention is the provision of means whereby there is sufficient delay in engagement of the clutch to enable the accelerator to be further moved to accelerate the motor after initiating the clutch engagement before the engagement becomes complete.

It is also desirable to make the operation of engaging the clutch smooth and progressive in all circumstances independently of the skill of the driver.

Further if the clutch is controlled in the manner hereinbefore described it is possible to render the operation of gear-changing in an automobile much easier by mounting the clutch between the change-speed gear and the road wheels, since on releasing the accelerator the motor is decelerated to a slow speed and with the change-speed gearing and the latter is isolated from the road wheels so that the engagement of a different speed ratio may easily be effected.

This particular arrangement of clutch and gear-box forms no part of the present invention which relates solely to a clutch and operating and controlling means therefor, but if the clutch is to be used in this way it is necessary to provide means whereby the engagement of the clutch is made independent of the direction of rotation of the driving member thereof, since, when the reverse gear is engaged, the driving member of the clutch has its rotation reversed and another object of this invention is the provision of such means.

The present invention broadly consists in the provision of a main clutch, which is normally disengaged by spring or the like means, with servo-engaging-means actuated by a pilot clutch controlled by the accelerator in the manner hereinbefore described. The servo-means engage the clutch in a mechanically correct manner with sufficient delay for accelerating the motor to the required extent and incorporate a motion-rectifying device whereby rotation of the pilot clutch in either direction is effective to engage the main clutch.

Thus the whole control of the clutch and the engine is accomplished by means of an accelerator pedal only, and if desired the brake pedal which in ordinary automobile practice is controlled by the same foot as the accelerator, may be moved over to the position ordinarily occupied by the clutch pedal and operated by the left foot of the driver while the accelerator is controlled by the right foot. This results in a great simplification of the operation of driving.

The invention admits of variation in the details of construction but in the preferred form the pilot clutch engages on depressing the accelerator and transmits the motion of the driving shaft to a shaft arranged to drive an oscillatory member which operates a ratchet which in turn imparts a step-by-step motion to a drum or the like. The latter by its rotation transmits axial movement to a screwed member which acts through springs to engage the main clutch members.

The invention will be more clearly understood and made capable of being carried into practice by persons skilled in the art by reference to the following description of the accompanying drawings which illustrate one constructional form of the invention as applied to a multiple plate clutch suitable for a motor road vehicle. Of these drawings:—

Fig. 1 is sectional elevation along the centre line (shown in Fig. 2 by the line f—f and looking in the direction of the arrows) of one form of construction of clutch suitable for a motor road vehicle.

Fig. 2 is a section along the line e—e in Fig. 1 looking in the direction of the arrows.

Fig. 3 is a section along the line g—g in Fig. 2 looking in the direction of the arrows.

Fig. 4 is a section along the line d—d in Fig. 1 looking in the direction of the arrows.

Fig. 5 is a plan view of a coil clutch locking device hereinafter referred to.

Fig. 8 is a schematic view of the outside of the casing showing the operating mechanism.

Figure 6:
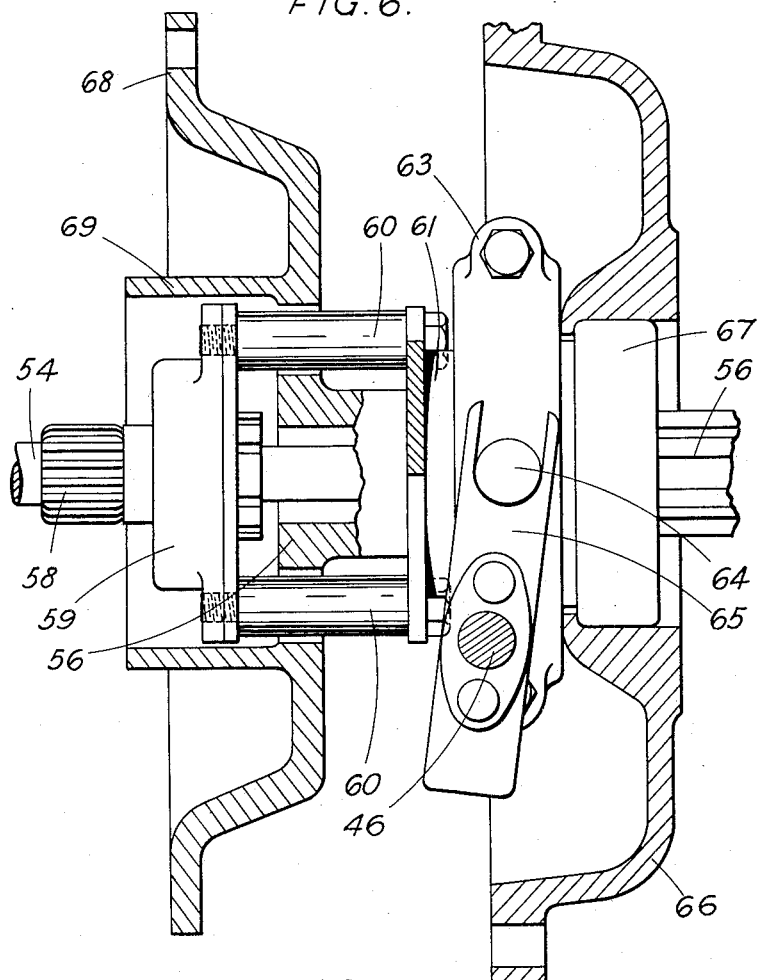
Fig. 6 is a side elevation partly in section of part of the mechanism comprising the driven shaft and the operating fork.
Figure 7:
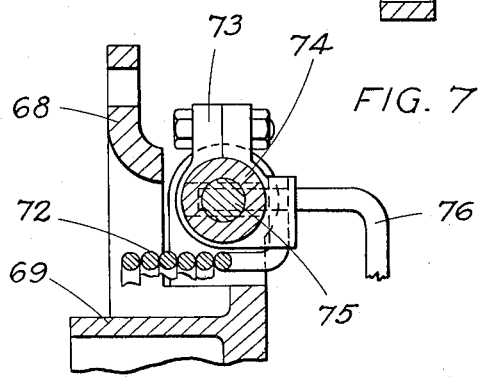
Fig. 7 is a side elevation partly sectioned showing the coil clutch locking device above referred to and described below.

In Figs. 1 to 7 and referring now more particularly to Figs. 1 and 2, 49 is a shaft driven by the engine supported by a bearing 50 in the case 51. To a flange formed on the ends of the shaft 49 is riveted a female cone 52 and within a recess in the end of shaft 49 is housed a bearing 53 supporting a shaft 54 which is supported at its other end in a bushing 55 housed in a recess in the driven shaft 56, the shaft 54 being axially slidable in the bearings 53 and 55 and having riveted to its left hand end (as shown in Fig. 1) a male cone 57 engaging with the female cone 52 these two forming the pilot clutch.

Further the shaft 54 has integrally formed with it near its other end a spur sun wheel 58 and carries between the spur sun wheel 58 and the bushing 55 a bearing 59 the outer race of which is connected by means of the studs 60 (Fig. 6) to the sleeve 61 which is slidably mounted to the shaft 56 and carries a bearing 62 the outer race of which is housed in a housing 63 carrying trunnions 64 (see Fig. 6) engaging with the forked lever 65 which is mounted on a shaft 46 carried in a bearing (not shown) in the rear casing cover 66 which also houses a bearing 67 supporting the driven shaft 56.

The end of the shaft 56 within the casing is formed into a boss comprising a dished plate 68 and within this a hub 69 carrying by means of a bushing 70 a drum 71 concentric with the hub 69. Round the drum 71 is wound a coil spring 72 one end of which is attached to the drum 71 and the other to a split clip 73 (see Fig. 7) holding a slotted pin 74 in which is screwed an adjustable stud 75 (see Figs. 4, 5 and 7) having a ball end which is held in contact with a coil clutch locking member 76 by a spring 77 which abuts against the clip 73 (see Figs. 4 and 5) and a collar 78 which with another collar 79 form sliding supports for the slotted pin 74, the collars 78 and 79 being formed integral with the dished plate 68, the hub 69 and the shaft 56. The coil clutch locking member 76 comprises an arm formed integral with the sleeve 61 which arm is bent over and inserted in the slot of the pin 74, the face 80 of the arm bearing against the ball end of the stud 75 being inclined to the axis of the stud 75.

Integral with the drum 71 is a ring 81 having formed in it special notches 82 with sloping bases (see Fig. 2) carrying rollers 83, the system formed by the notched ring 81, 82, the rollers 83 and an outer drum 84 forming a roller ratchet the rollers being held up to their work by springs 85. A second roller ratchet comprises the outer drum 84 a notched ring 86 and rollers 87 and springs 88. The notched ring 81 is connected to a flanged sleeve 89 by hollow pins 90 and bolts 91, the said hollow pins carrying by means of bushings the spur planet wheels 92 which mesh with the sun wheel 58 and carry eccentric blocks 93 sliding in guide webs 94 (Fig. 2) formed integral with the notched ring 86.

The outer drum 84 is attached by set screws to a flange 95 which is keyed to a sleeve 96 having formed in its outer surface a thread of about 45° pitch which engages with a screwed member or nut 97. Compression springs 98 are located concentrically to the main axis between faces on the nut 97 and a flanged cap 99 whose flange engages with a member 100 slidably mounted on the nut 97 and forming one of the outer plates of a multiplate clutch 101 the other outer member 102 of which is carried by means of the roller bearing 103 on the female cone 52 to which are splined the driving plates of the clutch 101. The member 102 is attached by means of the studs 104 to the ring 105 which is attached by the studs 106 through the distance piece 107 to the dished plate 68 (see Fig. 3). The driven members of the clutch 101 together with the outer member 100 are slidably located by the studs 104 and the member 100 is connected to the ring 105 by means of the tension withdrawal springs 108.

Referring to Fig. 8:—39 is the accelerator pedal of a motor vehicle, pivoted at 40 to the casing of the clutch and carrying levers 41 and 43; the lever 41 engages by means of a projection at its end with the slotted rod 42 which is in turn connected to the engine throttle. The lever 43 has a cam face formed on it at 43ª, 43ᵇ, which is in contact with a roller 44 carried by a triangular lever 45 pivoted at 37 to the clutch casing. To the upper arm of the lever 45 is attached the tension spring 47 adjustable at 47ª to vary the engaging pressure of the pilot clutch 52, 57, the other end of said spring being attached to the lever 48. The shaft 46 is contained within the clutch casing and carries the forked lever 65. 48ˣ is a pilot clutch return spring anchored to the casing and acting on the lever 48.

The method of operation is as follows:—
Referring to Fig. 8:—When the accelerator pedal is depressed the first movement causes the cam face 43ᵃ to press down the roller while the pin at the end of the lever 41 travels along the slot in the rod 42. The depression of the roller 44 rocks the lever 45 and tensions the spring 47 which by means of the lever 48 causes the shaft 46 to rotate in a clockwise direction as shown in Fig. 8. Referring now to Figs. 1 to 7 more particularly Figs. 1 and 2, the rotation of the shaft 46 consequent on the depression of the pedal 39 acting by means of the forked lever 65 carries the trunnions 64 to the left (as shown in Fig. 6) carrying with them the housing 63, the bearing 62 and the sleeve 61 and also by means of the studs 60 the bearing 59, the shaft 54 and the male cone 57 which engages with the female cone 52 forming the pilot clutch.

The female cone 52 being in connection with the engine by means of the shaft 49 is rotating slowly (the engine throttle being in the idling position). Hence, as soon as engagement commences the male cone 57 begins to turn, thus by means of the sun wheel 58 turning the planet wheels 92. At the same time in its leftward movement the sleeve 61 carries with it the arm 76 of the coil clutch locking member which movement allows the screwed stud 75 to travel forward (to the right in Figs. 4 and 5) its ball-shaped end being in contact with the inclined face 80 of the arm 76, contact being maintained by the spring 77 acting through the clip 73 and the slotted pin 74.

The movement of the pin 74 and clip 73 causes the coil spring 72 to tighten on the drum 71 the spring and drum forming a coil clutch, serving as a locking device.

This locks the drum 71 to the dished plate 68 by means of the spring 72, the clip 73, the spring 77, and the collar 78, for motion in one direction, and by means of the spring 72, the clip 73, the pin 74, the stud 75, the arm 76 and the collar 79 for motion in the other direction.

At the same time the blocks 93 are prevented from rotating with the planet wheels 92 by the constraint of the guide webs 94, and since the blocks 93 are eccentrically mounted on the planet wheels 92, the rotation of the latter transmits to the blocks 93 an oscillation motion both radial and circumferential (of the principal axis of the device). The radial component of this oscillation is ineffective since the blocks 93 are free to slide radially in the guides 94 but the circumferential component is transmitted by the guide webs 94 to the notched ring 86. It may be noted that the eccentric blocks 93 are assembled in such a manner that their circumferential oscillatory movements are oppositely directed, so that the member 86, 94 is caused to oscillate about its centre through a small angle. Clearly if the eccentric blocks were otherwise assembled they could only cause the mechanism to jam.

The notched ring 86, rollers 87 and outer ring 84 constitute a rotary ratchet device. Similarly the notched ring 81, 82, rollers 83, and outer ring 84 constitute a second ratchet operative in the same direction as the former ratchet. Since the ring 81, 82, is integral with the drum 71, it is locked to the driven shaft 56 in the manner hereinbefore described so that the ratchet 81, 82, 83 constitutes a fixed or holding ratchet, while the ratchet 86, 87, constitutes an oscillatory driving ratchet for the ring 84, and rotates the ring 84 through a small angle (in an anticlockwise direction in Fig. 2) at each oscillation, any return movement being prevented by the holding ratchet. Thus the ring 84 is rotated step by step in an anti-clockwise direction as shown in Fig. 2.

The drum 84 is prevented from rotating in the opposite direction (relatively to the shaft 56) by the action of the ratchet comprising the notched ratchet ring 81 and the rollers 83 which jam when the drum 84 tends to be rotated in a clockwise direction (Fig. 2) relatively to the notched ring 86 which is locked by means of the drum 71 and the spring 72 as described above to the dished plate 68 forming the end of the shaft 56.

The intermittent turning of the outer drum 84 relatively to the member 68 and consequently to the nut 97 which rotates (or is stationary) together with the members 100, 104, 105, 106, 107, and 68, causes the screwed sleeve 96 to turn; also since this sleeve is fixed to the drum 84 by the member 95 and the relative turning movement of the screwed sleeve 96 in the nut 97 causes the latter to move to the left (in Fig. 1) thus compressing the springs 98 and progressively engaging the clutch 101 by means of the members 99 and 100. It may be noted that relative movement between the shaft 54 and the shaft 56 in either direction will give the necessary oscillatory movement to the ratchet ring 86 thus engaging the clutch 101 in the manner described provided that the coil clutch formed by the spring 72 and the drum 71 is locked.

The engagement of the clutch 101 transmits the motion of the shaft 49 by means of the splines on the female cone 52, the driving and driven plates of the clutch 101, the studs 104, the members 105, 106, 107 and 68 to the shaft 56 which is in connection with the road wheels of the vehicle.

Referring again to Fig. 8 the proportion of the cam face 43ᵃ and the slot in the rod 42 are so designed that as soon as the roller 44 has moved far enough to commence the engagement of the pilot clutch 52, 57 (Fig. 1) the lever 41 begins to move the rod 42 and not before.

Further depression of the accelerator pedal pulls the rod 42 which opens the engine throttle. When the accelerator pedal has moved down so far that the part of the cam face designated by 43$^b$ comes onto the roller 44, the pilot clutch 52, 57 actuated as described above is fully engaged and owing to the shape of the cam face 43$^b$ the resultant force between the cam and the roller passes through the pivot 40 so that there is no load on the pedal other than that of the accelerator return spring not shown in these drawings. When the roller 44 is in contact with the part 43$^b$ of the cam face further movement of the pedal causes no further movement of the lever 45, but is solely employed in opening the engine throttle. On releasing the pedal 39 the lever 45 is returned by the spring 47 and the pilot clutch 52, 57 is disengaged by the return spring 48$^x$ acting on the lever 48, thus causing the shaft 46 to turn in the reverse direction to that described above whereupon by means of the chain of elements 65, 64, 63, 62, 61, 60, 59 and 54 the pilot clutch 57, 52 is disengaged.

At the same time the withdrawal of the arm 76 pushes back the stud 75 by means of the inclined face 80 and this acting through the elements 73 and 74 against the spring 77 releases the coil clutch formed by the spring 72 and drum 71. The ratchet ring 81 being integral with the drum 71 is now unable to restrain the motion of the outer drum 84 which is now free to rotate relatively to the dished plate 68 and to the ratchet ring 81 owing to its ability to slip, there being now no force to jam the ratchet rollers. The motion is in the reverse direction and the screwed sleeve 96 turns with the drum 84.

There is now no restraint on the springs 98 which expand and push the nut 97 to the right (in Fig. 1) which owing to its coarse pitch screws the screwed sleeve 96 carrying with it the member 95 and the outer drum 84 freely in a reverse direction until the nut 97 abuts against the member 95. The release of compression of the springs 98 acting by means of the cap 99 against the flange of the member 100 permits the withdrawal of the latter member by the springs 108 thus disengaging the main clutch 101.

This action does not however take place until the lever 41 (Fig. 8) has moved back so far that the pin at its end is free in the slot of the rod 42 that is until the rod 42 has brought the engine throttle to the fully closed or idling position. Thus the main clutch 26 cannot be disengaged until the engine is idling and hence the engine may be used as a brake by letting the pedal 39 back far enough to close the throttle but not far enough to allow the mechanism comprised by the cam face 43$^a$, the roller 44, the lever 45 and the internal train of elements as described above to move far enough to allow the main clutch 101 to be withdrawn.

It may be explained that the speed and smoothness with which the coil clutch formed by the spring 72 and the drum 71 takes up its engagement is regulated by adjusting the screwed stud 75 in the slotted pin 74.

What I claim is:—

1. In an automobile having a motor and an accelerator therefor, the combination with a main friction clutch and means normally holding said main clutch out of engagement, of a pilot clutch, main-clutch-engaging servo-means actuated by said pilot clutch and including a motion rectifying device so operating as to bring about engagement of the main clutch irrespectively of the direction of rotation of the pilot clutch and means operatively connected to the accelerator for engaging the pilot clutch on accelerating the motor.

2. In an automobile the combination as claimed in claim 1 and including spring means normally holding the pilot clutch disengaged and means for relieving the accelerator of the load of the said pilot-clutch-disengaging spring means at such time as the pilot clutch is fully engaged.

3. In an automobile having a motor and an accelerator therefor, the combination with a main friction clutch and means normally holding said main clutch disengaged of a pilot clutch, main-clutch-engaging servo-means actuated by said pilot clutch and including a motion rectifying device so operating as to bring about engagement of the main clutch irrespectively of the direction of rotation of the pilot clutch and means operatively connected to the accelerator for engaging the pilot clutch on first accelerating the motor including means permitting full control of the motor with the pilot clutch engaged.

4. In an automobile a motor, an accelerator therefor, driving and driven main clutch members, means normally holding said clutch members disengaged, main-clutch engaging servo-means carried by one of said clutch members, a pilot clutch adapted to connect the other clutch member with said servo-means to actuate same, a motion rectifying device incorporated in the servo-means for rendering the latter operative to engage the main clutch members irrespectively of the direction of their relative rotation and means operatively connected to the accelerator for engaging the pilot clutch on accelerating the motor.

5. In an automobile a motor, an accelerator therefor, a main friction clutch, means normally holding said main clutch disengaged, a pilot clutch, main-clutch-engaging servo-means including oscillatory ratchet means actuated by rotation of the pilot clutch in either direction, means operatively connected to the accelerator for engaging the pilot clutch on accelerating the motor and means for releasing the ratchet means on disengaging the pilot clutch, so that the main clutch is automatically disengaged on fully decelerating the motor.

6. In an automobile a motor, an accelerator therefor, a main friction clutch, means normally holding said main clutch disengaged, a pilot clutch, main-clutch engaging servo-means actuated thereby and including oscillatory driving ratchet means, stop ratchet means and stop ratchet locking means, means operatively connected to the accelerator for engaging the pilot clutch on accelerating the motor and means for releasing the stop ratchet locking means on disengaging the pilot clutch, so that the main clutch is automatically disengaged on fully decelerating the motor.

7. In an automobile a motor, an accelerator therefor, a main clutch comprising frictionally engaging members, means normally holding said main clutch disengaged, a pilot clutch, main-clutch-engaging servo-means actuated thereby and including sun and planet gearing, eccentric means actuated thereby, driving ratchet means oscillated by the eccentric means, a screw and nut device actuated by the driving ratchet means and adapted to engage the main clutch, cushioning means between the screw and nut device and the frictionally engaging members of the main clutch, stop ratchet means and stop ratchet locking means including a drum and coil spring wound thereon, means operatively connected to the accelerator for engaging the pilot clutch on accelerating the motor and means for releasing the said coil spring from the said drum on disengaging the pilot clutch, so that the main clutch is automatically disengaged on fully decelerating the motor.

8. In an automobile a motor, an accelerator therefor, a clutch including main driving and driven members, frictionally engaging elements carried thereby, spring means normally holding the frictionally engaging elements disengaged, engaging spring means normally inoperative, an engaging member slidable on the driven clutch member and adapted to compress the engaging spring means and having formed thereon a quick-pitched thread, a coacting threaded member rotatable in the driven clutch member and axially restrained, a pair of circular ratchets coacting with said rotatable threaded member, one such ratchet being a driving and the other a stop ratchet, transverse guides carried by the driving ratchet, slide-blocks mounted in said guides, planet wheels carried by the stop ratchet and eccentrically journalled in said slide blocks, a pilot clutch member engageable with the main driving member, a sun wheel rotatable thereby and engaging with said planet wheels, a drum carried by the stop ratchet, a coil spring wound thereon and anchored to the main driven member, adjustable auxiliary spring means for tensioning the coil spring, means for releasing the coil-spring from the drum on disengaging the pilot clutch member, spring means normally holding the pilot clutch disengaged, means operatively connected to the accelerator for engaging the pilot clutch member on first moving the accelerator to accelerate the motor, and means for relieving the accelerator of the load of the pilot clutch member disengaging spring means when the pilot clutch member is fully engaged.

EDWARD HENRY JAMES CECIL GILLETT.